(12) United States Patent
Westnedge

(10) Patent No.: US 7,540,514 B2
(45) Date of Patent: Jun. 2, 2009

(54) VEHICLE SUSPENSIONS

(75) Inventor: Andrew Westnedge, Northampton (GB)

(73) Assignee: Hendrickson USA, LLC, Itasca, IL (US)

( * ) Notice: Subject to any disclaimer, the term of this patent is extended or adjusted under 35 U.S.C. 154(b) by 0 days.

(21) Appl. No.: 11/470,391

(22) Filed: Sep. 6, 2006

(65) Prior Publication Data

US 2007/0210549 A1    Sep. 13, 2007

(30) Foreign Application Priority Data

Sep. 8, 2005    (GB)    ................................ 0518300.9

(51) Int. Cl.
*B60G 9/00*    (2006.01)
(52) U.S. Cl. ............................................. 280/124.116
(58) Field of Classification Search .......... 280/124.116, 280/124.128; 248/200, 201, 220.22
See application file for complete search history.

(56) References Cited

U.S. PATENT DOCUMENTS

| | | | | |
|---|---|---|---|---|
| 3,751,021 A | * | 8/1973 | Foster | .......................... 267/52 |
| 4,371,190 A | * | 2/1983 | Vandenberg | .......... 280/124.116 |
| 4,801,129 A | * | 1/1989 | Wells | ........................... 267/52 |
| 4,895,350 A | * | 1/1990 | Schoof et al. | .................. 267/52 |
| 5,921,570 A | * | 7/1999 | Lie | ...................... 280/124.175 |
| 5,950,971 A | * | 9/1999 | Koumbis et al. | ............. 248/200 |
| 6,959,932 B2 | * | 11/2005 | Svartz et al. | .............. 280/5.514 |
| 2004/0164513 A1 | * | 8/2004 | Svartz et al. | ........... 280/124.128 |
| 2005/0189736 A1 | * | 9/2005 | Svartz et al. | ........... 280/124.128 |
| 2006/0049600 A1 | * | 3/2006 | Dudding et al. | ......... 280/124.11 |

* cited by examiner

*Primary Examiner*—Faye M. Fleming
(74) *Attorney, Agent, or Firm*—Trexler, Bushnell, Giangiorgi, Blackstone & Marr, Ltd.

(57) ABSTRACT

A vehicle suspension which includes an axle and at least one trailing arm, and there being a seat for the or each trailing arm secured to the axle by U-shaped bolts, the or each seat being of generally U-shaped and inverted configuration with a leg dependant from a body to each side, the body having an inner surface to locate on the axle such that the legs extend alongside the axle to opposite sides, the inner surface of each leg and the surface having a continuous recess of a width less than the width of the seat, and there being a U-shaped insert located in the recess, the legs of the insert extending beyond the lower end of each leg and there being a means to secure the exposed ends of the insert to opposite sides of the axle, the insert having a flexibility or resilience to permit a movement of the trailing arm and seat about the axle.

4 Claims, 2 Drawing Sheets

VEHICLE SUSPENSIONS

This invention relates to vehicle suspensions, and is particularly, but not necessarily exclusively, concerned with medium weight lorries with an intended maximum axle weight of 9.5 tonnes.

Lorries of the type referred to frequently employ air spring suspension systems, where an air spring is positioned on a trailing arm attached to an axle, and where, ordinarily, the axle is of pressed steel construction to form a casing.

Hitherto, and predominantly, two methods have been used to secure trailing arms to each end of an axle casing. First, there is the system relying entirely on force, where a trailing arm is positioned on an intermediate clamp member located on the axle casing, with a top clamp member laid on the trailing arm and a bottom clamp member positioned below the axle casing, there being U-bolts, preferably two for each trailing arm, to extend around the top clamp member and through co-operating holes in the intermediate and bottom clamp members, with nuts engaging threaded end sections of the arms of the U-bolts. The application of excessive force through the U-bolts can cause a distortion of the axle casing that can cause a misalignment of the trailing arms, and it is not unknown for the components to move under the excessive torsional forces that can arise during cornering of the vehicle, again causing a misalignment of the trailing arms.

Second, it is known to provide a trailing arm seat and weld it in place on an axle casing. Here, there are inevitable gaps between the inner face of the seat and the outer face of the axle casing caused by manufacturing tolerances, and there is the inevitable creation of large stresses in the axle casing in the vicinity of the weld, when the trailing arm seat is subjected to torsional loading, particularly as the trailing arm seat is usually a substantial casting and the axle casing is of relatively thin sheet metal. Another problem with a welded seat is that a considerable difficulty is encountered in positioning it on the axle to hold a trailing arm in the correct alignment, particularly when, as is currently so, the trailing arms taper in both the horizontal and vertical planes.

The object of the present invention is to provide a vehicle suspension that avoids those disadvantages mentioned above.

According to the present invention a vehicle suspension comprises an axle and at least one trailing arm, there being a seat for the or each trailing arm, the or each seat having a primary recess in which the axle is located, the primary recess having a transverse secondary recess in which an insert is located, the insert being positively secured in the primary recess, and having end sections extending beyond the edges of the primary recess, that are positively secured to the adjacent walls of the axle.

According to a second aspect of the invention a seat suitable for use in a vehicle suspension system comprises a primary recess in one (lower) surface of the seat, a secondary transverse recess in the primary recess, and an insert bent into generally U-shaped configuration, said insert being fitted into the secondary recess and there secured by welding, with end sections of the insert extending beyond the edges of the primary recess.

Preferably, the seat is a solid cast or machined weldable steel component, and is formed with a longitudinal recess to create an inner face with dependent side walls across which the secondary recess extends. Further preferably, the insert is formed from relatively thin sheet weldable material to be flexible or resilient that is bent into the generally U-shape to fit in the transverse recess.

To secure the insert to the seat, a weld between the insert and the bottom of the secondary recess can be formed, and to secure the seat to the axle casing, the protruding end sections of the insert can be welded to the walls of the axle casing. To assist in securing the trailing arm to the axle casing, top and bottom clamp members can be provided with U-bolts extending around the top member, with the legs of the U-bolts extending through co-operating holes in the trailing arm seat and the bottom clamp member with securing nuts engaging threaded end sections of the arms of the U-bolts.

There is therefore provided a positive location of the seat on the axle casing that avoids the vague location of non-welded seat constructions, but with a major reduction of stresses in the axle casing known in conventional welded seat constructions. There is eliminated to a substantial degree the fitting problems of conventional constructions, by the insert accommodating manufacturing tolerances between the seat and the axle casing, and the flexible or resilient nature of the insert allows a limited movement between the trailing arm seat and the axle casing thereby reducing local stresses.

One embodiment of the invention is illustrated in the accompanying drawings, in which.

Figure 1:
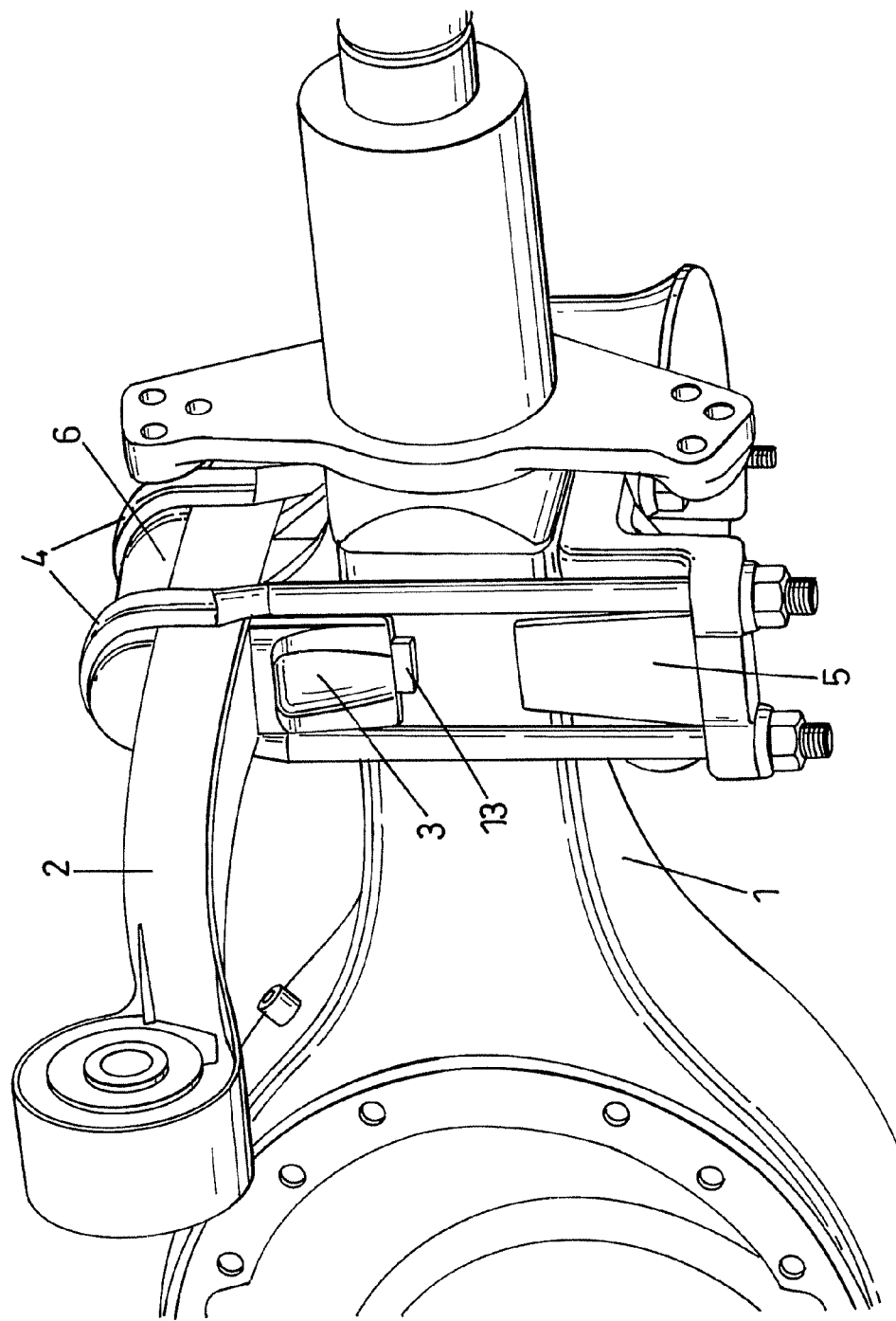
FIG. 1 is a perspective view of part of one embodiment of a vehicle suspension in accordance with the invention.

In the drawings, FIG. 1 shows part of a vehicle axle and suspension system where the axle casing 1 supports a trailing arm 2 that supports an air spring (not shown) of an air spring suspension, or to which is attached a hydraulic strut (not shown) of a hydraulic suspension system.

As is illustrated, a seat 3 is fitted to the axle casing 1 and the trailing arm 2 held secure to the seat by U-bolts 4 bolted to a bottom clamp member 5 lying below the axle casing 1 and extending over a top clamp 6 sat on the axle casing 1. Although not illustrated, stud-like location means can be provided on the under surface of the trailing arm 2 to engage in a strategically located recess in the upper face of the seat.

Figure 2:
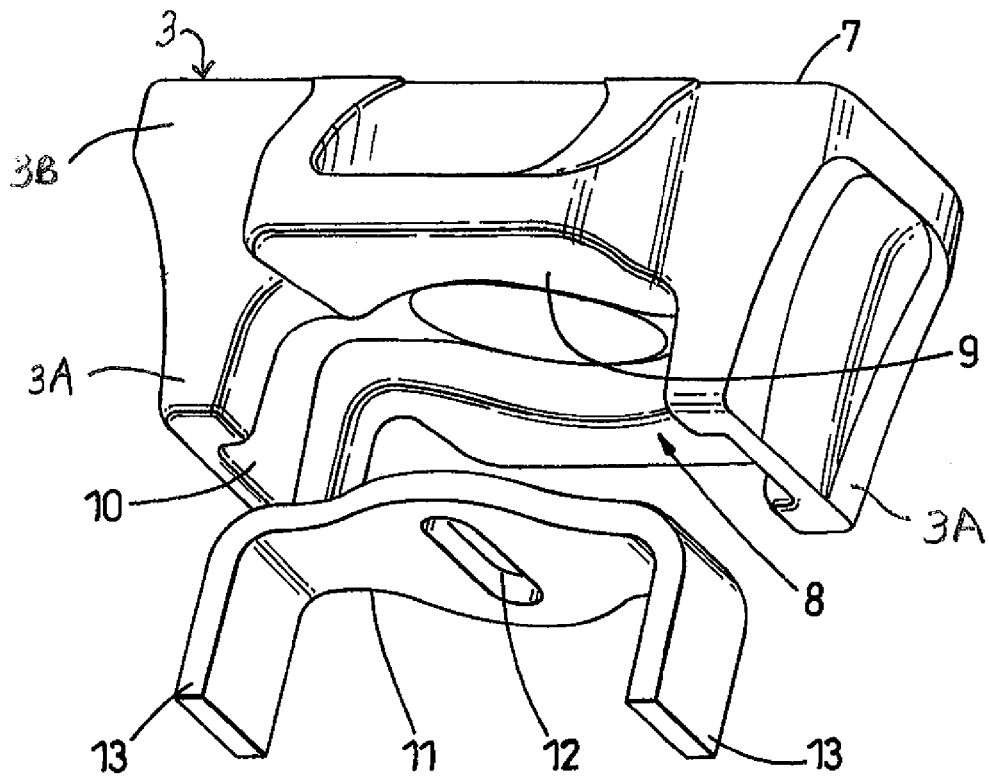
FIG. 2 is an exploded perspective view from above and one side of the trailing arm seat of FIG. 1.
Figure 3:
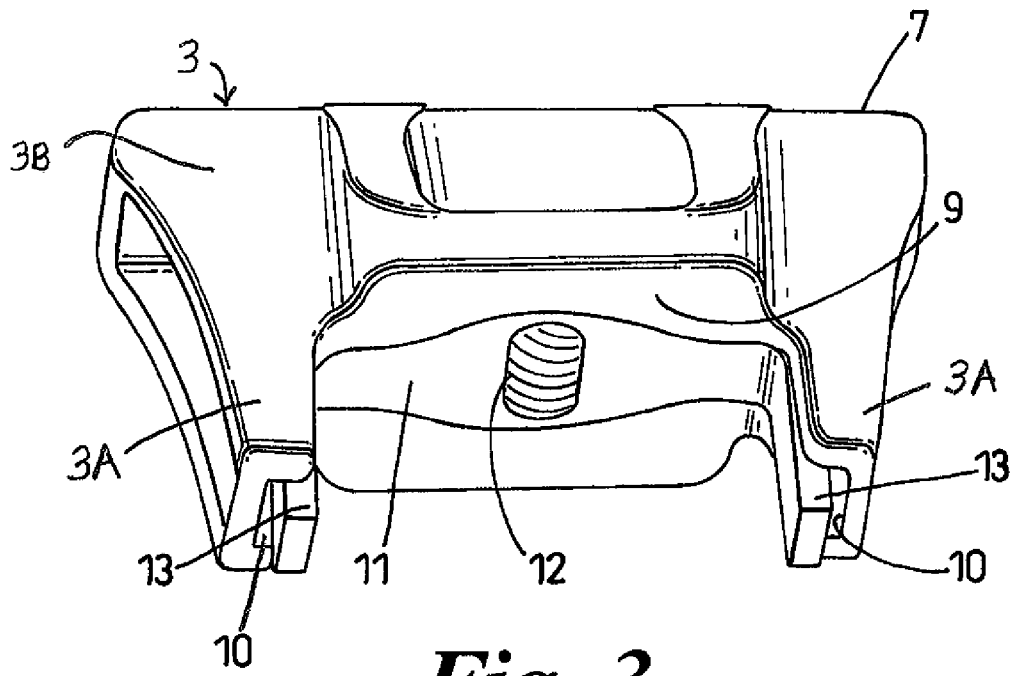
FIG. 3 is a perspective view from the other side of the trailing arm seat of FIG. 1.

As is shown more particularly by FIGS. 2 and 3, the seat 3 is formed as a cast or machined component of weldable steel. The seat has a flat upper surface 7, and the lower surface 8 shaped into a primary longitudinal (in the direction of the vehicle longitudinal axis) recess 9 to allow the seat to fit on to the upper surface of the axle casing 1. In the primary longitudinal recess is a secondary transverse recess 10, to receive an insert 11 in the form of a thin sheet of weldable metal, suitably bent into a U-shape to fit in the second recess 10. The insert 11 is relatively flexible or resilient to ensure that it is a reasonably close fit in the second recess.

As shown in FIGS. 2 and 3, the seat 3 is generally U-shaped and has an inverted configuration with a leg 3A dependant from a body 3B to each side. The body 3B has an inner surface 9 to locate on the axle such that the legs 3A extend alongside the axle to opposite sides. The inner surface of each leg 3A and the surface 9 have a continuous recess 10 of a width less than the width of the seat, and there is a U-shaped insert 11 located in the recess 10. The legs 13 of the insert extend beyond the lower end of each leg 3A and there is a means to secure the exposed ends of the insert to opposite sides of the axle, the insert having flexibility or resilience to permit a movement of the trailing arm and seat about the axle.

To secure the insert 11 to the seat 3, the insert is provided with a through hole 12 which, and as is illustrated in FIG. 3, is filled with weld metal, the length of the insert being such that when secured to the seat, end sections 13 of the insert protrude beyond the lower faces 14 of the sides 15 of the seat.

When fitted to the axle casing, as is shown in FIG. 1, the insert 11, and particularly the protruding sections 13, lie in close, if not abutting, proximity to the sides of the axle casing, and the seat 3 is secured in place by welding the protruding sections 13 of the insert 11 to the axle casing sides.

The invention ensures a substantial elimination of fitting problems associated with conventional trailing arms of vehicle suspension systems, and by welding an insert into a recess in the seat for the trailing arm, and welding the insert to the casing, there is the substantial elimination of stressing of the welds during use, as a consequence of the insert being relatively resilient or flexible, allowing a limited movement between the trailing arm seat and the axle casing.

The invention claimed is:

1. A vehicle suspension comprising an axle and at least one trailing arm, and there being a seat for the or each trailing arm secured to the axle by U-shaped bolts, the or each seat being of generally U-shaped and inverted configuration with a leg dependant from a body to each side, the body having an inner surface to locate on the axle such that the legs extend alongside the axle to opposite sides, the inner surface of each leg and the surface having a continuous recess of a width less than the width of the seat, and there being a U-shaped insert located in the recess, the legs of the insert extending beyond the lower end of each leg and there being a means to secure the exposed ends of the insert to opposite sides of the axle, the insert having a flexibility or resilience to permit a movement of the trailing arm and seat about the axle.

2. A vehicle suspension as in claim 1, wherein the flexible or resilient U-shaped insert is secured in the recess of the seat by welding.

3. A vehicle suspension as in claim 1, wherein the securing of the exposed ends of the insert to the axle is by welding.

4. A seat suitable for use in a vehicle suspension system comprising a generally U-shaped body with dependant legs to each side, the inner surface of the body to locate on an axle and each leg of the seat having a continuous recess, of a width less than the width of the seat, and an insert bent into generally U-shaped configuration, the insert being fitted in and secured in the recess, and the end sections of the insert extending beyond the lower ends of the legs of the seat.

* * * * *